United States Patent
Urbach

(10) Patent No.: US 6,834,863 B2
(45) Date of Patent: Dec. 28, 2004

(54) BALL JOINT SEAL

(75) Inventor: Brian A. Urbach, Rochester Hills, MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 10/156,307

(22) Filed: May 28, 2002

(65) Prior Publication Data
US 2003/0222412 A1 Dec. 4, 2003

(51) Int. Cl.⁷ .............................................. F16J 15/52
(52) U.S. Cl. .................. 277/635; 277/555; 403/134; 403/51
(58) Field of Search .................. 277/555, 553, 277/554, 535, 634, 635; 464/173, 174, 175; 403/122–144; 267/140, 152, 153

(56) References Cited

U.S. PATENT DOCUMENTS

| 3,310,326 | A | * | 3/1967 | Melone | 277/635 |
| 3,322,445 | A | * | 5/1967 | Hassan | 403/51 |
| 4,121,844 | A | * | 10/1978 | Nemoto et al. | 277/635 |
| 4,133,542 | A | * | 1/1979 | Janian et al. | 277/555 |
| 4,322,175 | A | | 3/1982 | Szczesny | |
| 4,507,982 | A | | 4/1985 | Turner et al. | |
| 4,508,356 | A | * | 4/1985 | Janian | 277/555 |
| 5,163,692 | A | * | 11/1992 | Schofield et al. | 277/436 |
| 5,312,200 | A | * | 5/1994 | Buhl et al. | 403/134 |
| 5,649,779 | A | * | 7/1997 | Martin et al. | 403/51 |
| 5,799,953 | A | * | 9/1998 | Henderson | 277/554 |
| 6,502,831 | B2 | * | 1/2003 | Jarrus | 277/635 |
| 6,536,779 | B1 | * | 3/2003 | Maughan et al. | 277/635 |
| 2002/0084644 | A1 | | 7/2002 | Rinker et al. | |

FOREIGN PATENT DOCUMENTS

GB 2352286 1/2001

* cited by examiner

Primary Examiner—William L. Miller
(74) Attorney, Agent, or Firm—Tarolli, Sundheim, Covell & Tummino L.L.P.

(57) ABSTRACT

A ball joint includes a socket and a stud having a ball end portion received in the socket and a shank projecting from the socket. An annular seal has an intermediate portion extending between first and second end portions. The second end portion of the seal has an engagement portion in sealing engagement with the shank portion of the stud. A spring is molded in the second end portion of the seal and extends for 360 degrees around the circumference of the shank portion at a location radially outward of the engagement portion. The spring has a circular array of spring fingers that extend radially inward from a main body portion and exert a radially inward directed force on the engagement portion to maintain it in sealing engagement with the shank portion.

28 Claims, 3 Drawing Sheets

US 6,834,863 B2

BALL JOINT SEAL

BACKGROUND OF THE INVENTION

1. Technical Field

The present invention relates to a ball joint and, in particular, to a seal for a ball joint.

2. Description of the Related Art

A typical ball joint includes a socket and a ball stud. The ball stud has a ball end portion received in the socket and a shank portion projecting from the ball stud. The socket supports the ball stud for pivotal movement relative to the socket with the shank portion extending from the socket. The ball joint also includes a seal that has a first end portion that seals against the socket. A second end portion of the seal seals against the shank portion of the ball stud. The seal prevents lubricant from coming out of the ball joint and also prevents dirt and other items from entering into the ball joint. The second end portion of the seal may wear against the ball stud, but still needs to be kept in sealing engagement.

SUMMARY OF THE INVENTION

The present invention is a ball joint comprising a socket defining a pivot center, a bearing in the socket, and a stud having a ball end portion received in the bearing and a shank portion projecting from the socket. The stud has a longitudinal axis extending through the pivot center. The bearing supports the stud in the socket for pivotal movement about the pivot center. The ball joint further comprises an annular seal having an intermediate portion extending between first and second end portions of the seal. The first end portion of the seal is fixed to the socket. The second end portion of the seal has an engagement portion in sealing engagement with the shank portion of the stud. The seal includes a spring molded in the second end portion of the seal and extending for 360 degrees around the circumference of the shank portion of the stud at a location radially outward of the engagement portion of the seal. The spring has a main body portion and a circular array of spring fingers that extend radially inward from the main body portion and exert a radially inward directed force on the engagement portion of the seal to maintain the engagement portion of the seal in sealing engagement with the shank portion of the stud.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
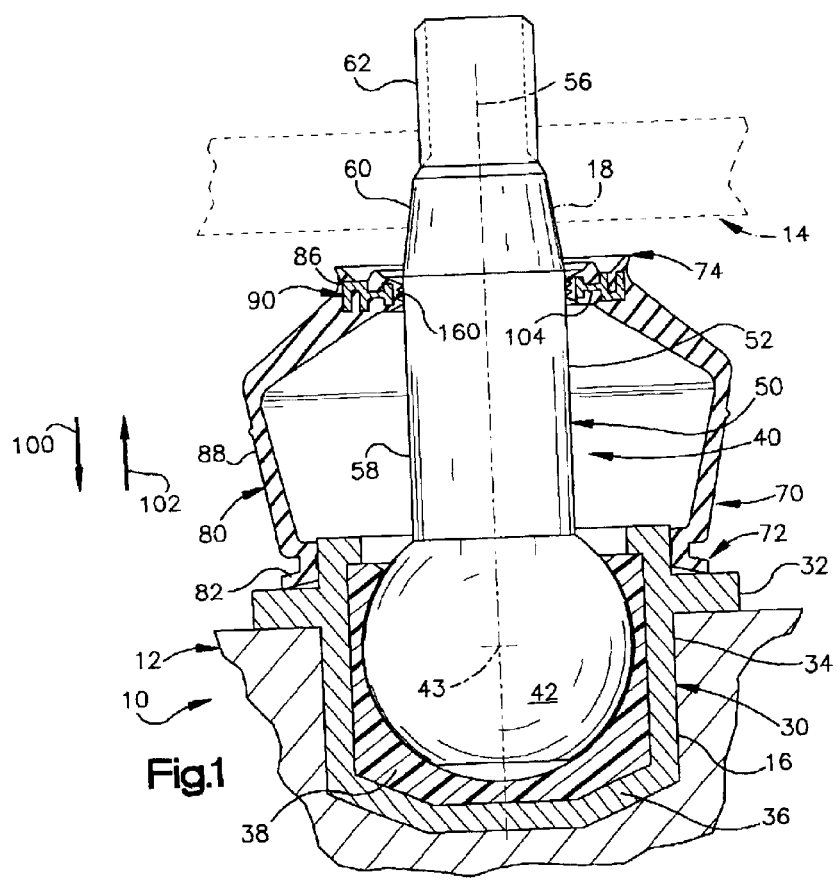
FIG. 1 is a sectional view of a ball joint constructed in accordance with the present invention.

The present invention relates to a ball joint for supporting a first vehicle portion for movement relative to a second vehicle portion. The present invention is applicable to various ball joint constructions. As representative of the invention, FIG. 1 illustrates a ball joint 10. The ball joint 10 is located between a first vehicle portion shown partially at 12 and a second vehicle portion shown schematically and partially at 14.

The first vehicle portion 12 may be a steering knuckle or steering yoke, for example. The first vehicle portion 12 has a cylindrical opening 16 for receiving the ball joint 10. The second vehicle portion 14 may be a control arm or steering yoke or steering knuckle, for example. The second vehicle portion 14 has a frustoconical surface that defines a tapered bore or opening indicated at 18.

The ball joint 10 is generally of a conventional construction and includes a socket 30 and a steel ball stud 40. The socket 30 is mounted in the opening 16 in the first vehicle portion 12. A mounting flange 32 extends radially outward from a side wall 34 of the socket 30, spaced from a closed lower end 36 of the socket.

A bearing 38 is located in the socket 30. A ball end portion 42 of the ball stud 40 is received in the bearing 38. The ball end portion 42 of the ball stud 40 is pivotable and rotatable in the bearing 38, about a pivot center 43, to provide for relative movement between the first vehicle portion 12 and the ball stud 40.

The ball stud 40 has a shank portion 50 that projects from the ball end portion. The shank portion 50 has a cylindrical first section 52 centered on a longitudinal central axis 56 of the ball stud 40. The axis 56 extends through the pivot center 43. The first section has a cylindrical outer surface 58. The shank portion 50 also has a second section 60 that has a tapered outer surface centered on the axis 56. The shank portion 50 also has a threaded end section 62.

When the ball joint 10 is assembled with the second vehicle portion 14, the tapered portion 60 of the shank 50 is fitted in the tapered opening 18 in the second vehicle portion in a tight, force-fitting connection. A nut (not shown) is screwed on the threaded end section 60 of the ball stud 40 to secure the connection.

The ball joint 10 further includes a seal 70. The seal 70 extends between the socket 30 and the first section 52 of the ball stud 40. The seal 70 has a first end portion 72 connected with the socket 30 and a second end portion 74 connected with the ball stud 40.

The seal 70 includes a seal member 80 and a retainer ring, or spring, 90. The seal member 80 is made from an elastomeric material. The elastomeric material is selected to have good flex fatigue life, puncture resistance, and abrasion resistance, etc.

The seal member 80 has a first end portion 82 fixedly connected with the socket 30. The first end portion 82 seals against the socket 30 and forms the first end portion 72 of the seal 70.

The seal member 80 has a second end portion 86. The second end portion 86 of the seal member 80 is adjacent to and connected with the shank portion 50 of the ball stud 40 in a manner described below. The second end portion 86 of the seal member 80 forms part of the second end portion 74 of the seal 70. The second end portion 86 of the seal member 80 is pivotable with the ball stud 40. The shank portion 50 of the ball stud 40 is rotatable relative to the second end portion 80 of the seal member 80.

The seal member 80 also has a main body portion 88. The main body portion 88 of the seal member 80 extends between and interconnects the first end portion 72 of the seal 70 and the second end portion 74 of the seal. The main body portion 88 of the seal member 80 forms a main body portion of the seal 70 itself.

The retainer ring, or spring, 90 is molded within the second end portion 86 of the seal member 80. The spring 90 is made from a plastic material, as described below. The spring 90 forms part of the second end portion 74 of the seal 70, together with the second end portion 86 of the seal member 80.

The spring 90 has an annular configuration that extends for 360 degrees around the shank portion 50 of the ball stud 40. The spring 90 has a main body portion 92 that has a ring-shaped or annular configuration. The main body portion 92 is located on the outer periphery of the spring 90.

The main body portion 92 of the spring 90 has a cylindrical outer side surface 94 that extends axially between parallel, annular, radially extending upper and lower end surfaces 96 and 98. (The terms "upper" and "lower" are used herein to describe the orientation of the spring as viewed in FIGS. 1-3 and 5, and are not limiting structurally. In the drawings, the arrow 100 indicates an "upward" direction, and the arrow 102 indicates an opposite, "downward" direction.)

The spring 90 includes a plurality of tangs, or spring fingers, or fingers 104. The fingers 104 extend radially inward from the inner periphery of the main body portion 92 of the spring 96, in a direction toward the axis 56. In the illustrated embodiment, thirty-six fingers 104 are provided on the spring 90. A larger or smaller number of fingers 104 can be provided, dependent on the diameter of the spring 90, among other factors.

The plurality of fingers 104 includes a first plurality or group of fingers that are referred to herein as "upper fingers" 106, and a second plurality or group of fingers that are referred to herein as "lower fingers" 108. All the upper fingers 106 are identical to each other. All the lower fingers 108 are identical to each other.

The upper fingers 106 are mirror images of the lower fingers 108, in a top-to-bottom manner. Thus, an upper finger 106, when viewed from above in FIG. 5, appears identical to a lower finger 108, when viewed from below in FIG. 5.

The upper fingers 106 are interspersed with the lower fingers 108 around the inner periphery of the main body portion 92 of the spring 90. Specifically, the upper fingers 106 are disposed in an alternating relationship with the lower fingers 108 around the axis 56. Each one of the upper fingers 106 is located between two adjacent lower fingers 108, and each one of the lower fingers 108 is located between two adjacent upper fingers 106. There is a gap between each two adjacent fingers 106, 108.

Because the upper fingers 106 are configured like the lower fingers 108, the spring 90 can be molded into the seal member 80 in either orientation-upper end surface 96 or lower end surface 98 facing toward the socket 12 and will function the same. This feature provides for ease of assembly.

Figure 6:
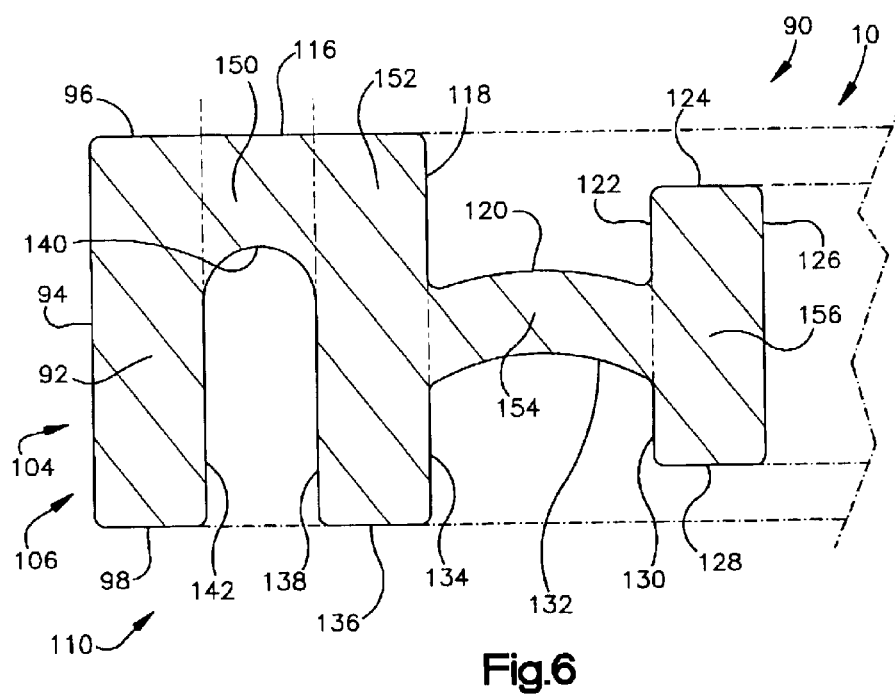
FIG. 6 is an enlarged view of a portion of FIG. 5.

Because the spring fingers 106 and 108 are identical to each other, one particular upper spring 110 finger shown in FIG. 6 is described in detail, with regard to its surfaces and the portions those surfaces define. The reference numerals for the surfaces and portions of the spring finger 110 are, in the drawings, sometimes used on other spring fingers of the spring 90.

The finger 110 has two side surfaces 112 and 114 that extend radially inward from the main body portion 92 in a direction toward the axis 56. The side surfaces 112 and 114 converge in a direction toward the axis 56. As a result, the finger 110 has a decreasing circumferential extent, or tapers, as it extends radially inward from the main body portion 92 of the spring 90. The side surface 112 on each finger 104 is adjacent to, but spaced apart from, the side surface 114 of the adjacent finger 104, to define the gap between them.

Figure 4:
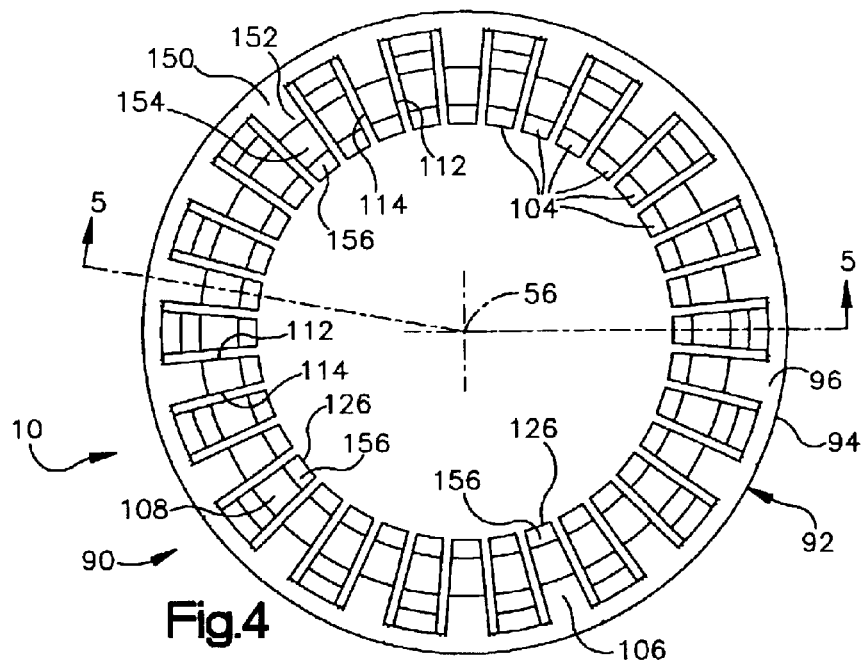
FIG. 4 is a top plan view of the spring of FIG. 3.

The finger 110 includes a first surface 116 that extends radially inward as an extension of the upper end surface 96. The first surface 116 is planar, and has an arcuate configuration centered on the axis 56, as viewed from above in FIG. 5, and as seen in FIG. 4. (Dot-dash lines are used in FIG. 6 to identify the divisions between adjacent surfaces.)

A second surface 118 extends axially from the first surface 116, in a direction perpendicular to the first surface and toward the plane of the lower end surface 98. The second surface 118 has an axial extent of about one third the axial extent of the outer side surface 94. The second surface 118 has a radially inwardly facing cylindrical configuration centered on the axis 56, as best seen in FIG. 4.

A third surface 120 extends generally radially inward from the second surface 118. The third surface 120 has an axially bowed configuration that is convex in the upward direction 100. The third surface 120 as viewed from above in FIG. 5, or as seen in FIG. 4, has an arcuate configuration centered on the axis 56.

A fourth surface 122 extends axially upward from the third surface 120, in a direction toward the plane of the upper end surface 96 and parallel to the second surface 118. The fourth surface 122 has an axial extent slightly less than that of the second surface 118, and terminates short of the plane of the upper end surface 96. The fourth surface 122 has a radially outwardly facing cylindrical configuration centered on the axis 56, as best seen in FIG. 4.

A fifth surface 124 extends radially inward from the fourth surface 122 in a direction perpendicular to the fourth surface and parallel to the plane of the upper end surface 96. The fifth surface 124 is planar, and has an arcuate configuration centered on the axis 56, as viewed from above in FIG. 5, and as seen in FIG. 4.

A sixth surface 126 extends axially downward from the fifth surface 124, in a direction toward the plane of the lower end surface 98 and parallel to the second surface 118 and the fourth surface 122. The sixth surface 126 terminates short of the plane of the lower end surface 98. The sixth surface 126 has a radially inwardly facing cylindrical configuration centered on the axis 56, as best seen in FIG. 4. The sixth surface 126 is the radially innermost surface of the finger 110.

A seventh surface 128 extends radially inward from the sixth surface 126. The seventh surface 128 is similar to the fifth surface 124. The seventh surface 128 is planar, and has an arcuate configuration centered on the axis 56, as viewed from below in FIG. 5, and as seen in FIG. 4.

An eighth surface 130 extends axially upward from the seventh surface 128, in a direction toward the plane of the upper end surface 96 and parallel to the sixth surface 126. The eighth 130 surface has an axial extent slightly less than that of the fourth surface 122. The eighth surface 130 has a radially outwardly facing cylindrical configuration centered on the axis 56, as best seen in FIG. 4. The eighth surface 130 is similar to the fourth surface 122.

A ninth surface 132 extends generally radially outward from the eighth surface 130. The ninth surface 132 has an axially bowed configuration that is concave in the downward direction 102 and extends parallel to the bowed third surface 120. The ninth surface 132 as viewed from below in FIG. 5, or as seen in FIG. 4, has an arcuate configuration centered on the axis 56.

A tenth surface 134 extends axially downward from the ninth surface 132, terminating in the plane of the lower end surface 98. The tenth surface 134 has a radially inwardly facing cylindrical configuration centered on the axis 56, as best seen in FIG. 4.

An eleventh surface 136 extends radially outward from the tenth surface 134. The eleventh surface 136 is planar, and has an arcuate configuration centered on the axis 56, as viewed from below in FIG. 5, and as seen in FIG. 4.

A twelfth surface 138 extends axially upward from the eleventh surface 136, terminating at about the level of the third surface 120. The twelfth surface 138 has a radially outwardly facing cylindrical configuration centered on the axis 56, as best seen in FIG. 4.

A thirteenth surface 140 extends generally radially outward from the twelfth surface 138. The thirteenth surface 140 has an axially bowed configuration that is concave in the downward direction 102. The thirteenth surface 140 as viewed from below in FIG. 5, or as seen in FIG. 4, has an arcuate configuration centered on the axis 56.

A fourteenth surface 142 extends axially downward from the thirteenth surface 140, terminating at the lower end surface 98 of the main body portion 92 of the spring 90. The fourteenth surface 142 has a cylindrical configuration centered on the axis 56, as best seen in FIG. 4.

The surfaces 112–142 of the spring finger 110 define a plurality of portions of the spring finger. The portions are not physically discrete, but are identified thus as they have specific separable functions. The spring finger 110 includes a first cantilever portion, or outer cantilever portion designated 150 in FIG. 5. The outer cantilever portion 150 extends generally radially inward, from the main body portion 92. The outer cantilever portion 150 is bounded or defined axially by the first surface 116 on top and the thirteenth surface 140 on the bottom.

Figure 5:
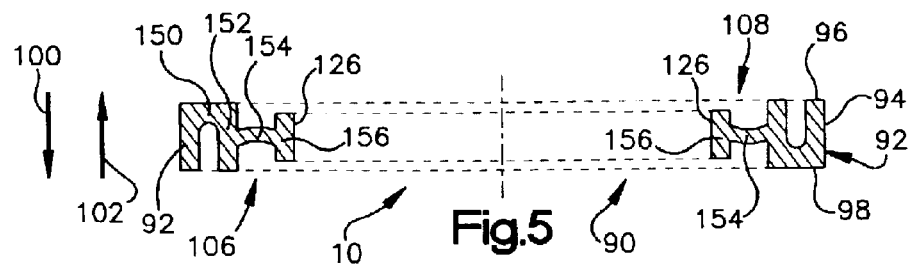
FIG. 5 is a sectional view of the spring of FIG. 4, taken along line 5—5 of FIG. 4.

The spring finger 110 includes an annular outer rib portion, or outer rib, designated 152 in FIG. 5. The outer rib 152 extends axially downward from the radially inner end of the outer cantilever portion 150. The outer rib 152 is supported on the spring main body portion 92 by the outer cantilever portion 150. The outer rib 152 is defined by the first surface 116, the second surface 118, the tenth surface 134, the eleventh surface 136, and the twelfth surface 138.

The spring finger 110 includes a second cantilever portion, or inner cantilever portion designated 154 in FIG. 5. The inner cantilever portion 154 extends generally radially inward from the outer rib 152. The inner cantilever portion 154 is defined axially by the third surface 120 on top and the ninth surface 132 on the bottom, and thus has a bowed configuration.

The spring finger 110 includes an inner rib portion, or inner rib, designated 156 in FIG. 5. The inner rib 156 extends axially both upward and downward from the radially inner end of the inner cantilever portion 154. The inner rib 156 is supported on the outer rib 152 by the inner cantilever portion 154. The inner rib 156 is defined by the fourth, fifth, sixth, seventh, and eighth surfaces 122–130, respectively.

The inner rib 156 is the portion of the spring finger 110 that is farthest radially inward. The sixth surface 126 on the inner rib 156, is the surface of the spring finger 110 that is farthest radially inward. The sixth surface 126 is curved in a cylindrical configuration centered on the axis 56.

The spring 90 is preferably injection molded, and preferably from a resilient plastic material. The material is selected to provide a spring force to the upper and lower fingers 106 and 108, when one part of the spring 90 is acted upon by force tending to move it relative to another part of the spring.

Specifically, because the spring 90 is made from a resilient material, the inner rib 156 is resiliently movable relative to the outer rib 152, upon deformation or bending of the inner cantilever portion 154. Thus, if the outer rib 152 is held still, a radially outwardly directed force on the inner rib 156 causes the inner cantilever portion 154 to deflect, bowing in the upward direction 100, and the inner rib 156 moves radially outward toward the outer rib 152.

Similarly, because the spring 90 is made from a resilient material, the outer rib 152 is resiliently movable relative to the main body portion 92 of the spring, upon deformation or bending of the outer cantilever portion 150. Thus, if the main body portion 92 is held still, a radially outwardly directed force on the outer rib 152 causes the outer cantilever portion 150 to deflect, bowing in the upward direction 100, and the outer rib 152 moves radially outward toward the main body portion 92. Because the outer cantilever portion 150 is radially shorter than the inner cantilever portion 154, the outer rib 152 is not deflectable as much as the inner rib 156. The primary radial deflection in the spring 90 occurs by deformation of the inner cantilever portion 154.

When the spring 90 (FIG. 2) is molded in the seal member 80, the spring is substantially completely enclosed in the material of the seal member, except at one annular groove area 158 located on the second end portion 86 of the seal member 80.

An engagement portion 160 of the seal member 80 is disposed radially inward of the spring 90. The engagement portion 160 includes three axially spaced lips 162 for engagement with the first section 52 of the shank portion 50 of the stud 40. The three lips 162, and the remainder of the engagement portion 160, are located radially inward of the inner rib 156 of the spring 90. The axial extent of the engagement portion 160 is about the same as the axial extent of the inner rib 156.

Figure 2:
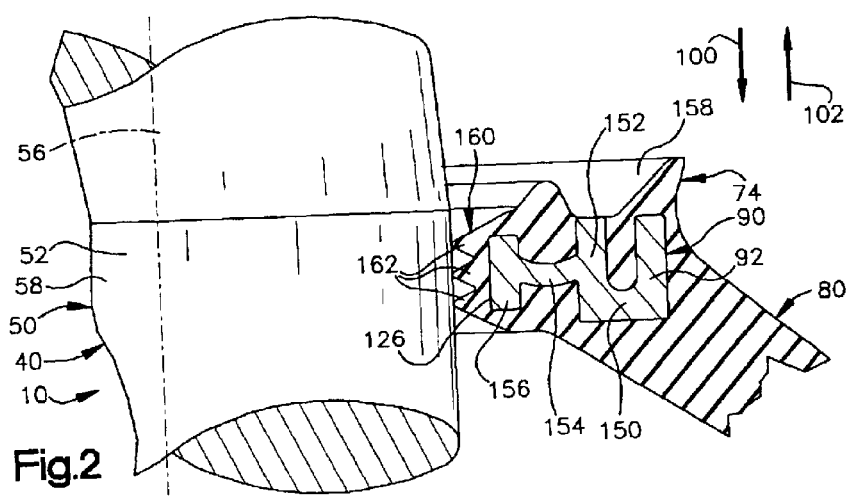
FIG. 2 is an enlargement of a portion of FIG. 1.
Figure 3:
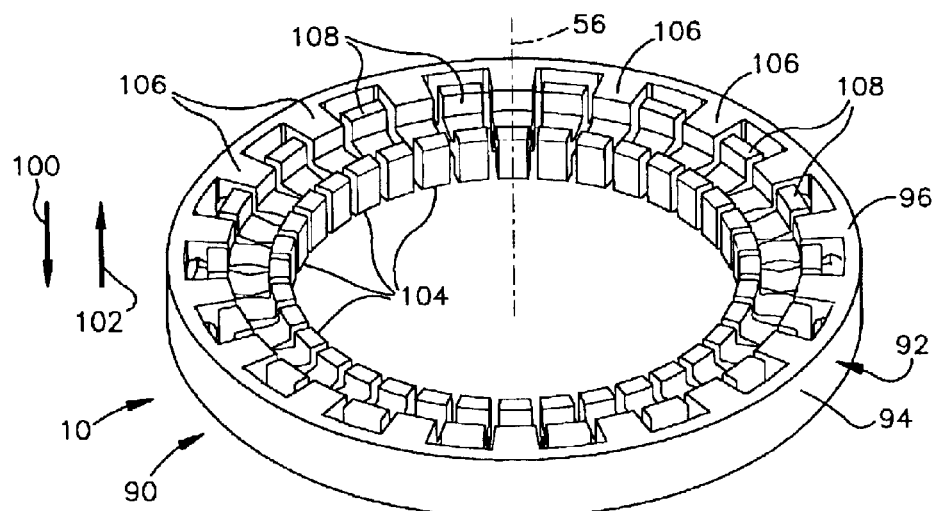
FIG. 3 is a perspective view of a spring that forms part of the ball joint of FIG. 1.

The dimensions of the spring 90, and the dimensions of the seal member 80, are selected so that there is an interference fit between the engagement portion 160 and the shank 50 when the seal 70 is fitted on the stud 40 as shown in FIG. 2.

As one example, the shank portion 52 of the stud 40 has an outer diameter of 23.15 millimeters. The engagement portion 160 of the seal member 80, when in the free state, has an inner diameter of 17.5 millimeters. This is less than the outer diameter of the shank portion 52 of the ball stud 40. The spring 90 has am inner diameter of 22.0 millimeters when in the free state.

When the seal 70 is mounted on the stud 40, the engagement portion 160 including the lips 162 is, therefore, urged radially outward. This force is transmitted to the spring 90, and the inner ribs 156 of all the spring fingers 104 are urged radially outward. The inner cantilever portions 154 of the spring fingers 104 resiliently deflect.

Because the spring fingers 104 are resiliently deflected radially outward, the spring 90 exerts a radially inward directed force on the engagement portion 160 of the seal member 80. This force maintains the engagement portion 160 in sealing engagement with the shank portion 52 of the stud 40. Specifically, the main body portion 92 of the spring 90, with its annular or ring-shaped configuration, provides a base against which the spring fingers 104 resiliently deflect. This deflection causes the spring fingers 104 to exert a constant, radially inwardly directed force on the engagement portion 160 of the seal member 80. This force is exerted uniformly at all locations around the 360 degree circumference of the shank portion 52 of the ball stud 40, because the array of spring fingers 104 extends for 360 degrees around the axis 56, with very little space in between adjacent spring fingers. This force maintains the engagement portion 160 of the seal member 80 in sealing engagement with the shank portion 52 of the stud 40.

The engagement of the seal member 80 with the ball stud 40 seals in lubricant that is contained in the ball joint 10. The engagement of the seal member 80 with the ball stud 40 also prevents the ingress of any material from outside the ball joint 10, such as dirt or oil.

Over the lifetime of the ball joint 10, the engagement portion 160 of the seal member 80 may wear. For example, the ball stud 40 may rotate within the seal 70, so that there is rotating or sliding contact between the shank portion 50 of the ball stud, and the engagement portion 160 of the seal 70. Should any wear occur, the radially inward spring force exerted by the spring fingers 104 urges the engagement portion 160 farther radially inward, to maintain the engagement portion in sealing engagement with the ball stud 40. The sealing engagement between the seal 70 and the stud 40 is maintained uniformly at all locations around the 360 degree circumference of the shank portion 52 of the ball stud.

From the above description of the invention, those skilled in the art will perceive improvements, changes and modifications in the invention. Such improvements, changes and modifications within the skill of the art are intended to be covered by the appended claims.

Having defined the invention, I claim:

1. A ball joint comprising:

a socket defining a pivot center;

a bearing in said socket; and a stud having a ball end portion received in said bearing and a shank portion projecting from said socket, said stud having a longitudinal axis extending through said pivot center;

said bearing supporting said stud in said socket for pivotal movement about said pivot center;

said ball joint further comprising an annular seal having an intermediate portion extending between first and second end portions of said seal, said first end portion of said seal being fixed to said socket, said second end portion of said seal having an engagement portion in sealing engagement with said shank portion of said stud;

said seal including a spring molded in said second end portion of said seal and extending for 360 degrees around the circumference of said shank portion of said stud at a location radially outward of said engagement portion of said seal;

said spring having a main body portion and having a circular array of spring fingers that extend radially inward from said main body portion and exert a radially inward directed force on said engagement portion of said seal to maintain said engagement portion of said seal in sealing engagement with said shank portion of said stud, said array of spring fingers includes a first group of spring fingers having cantilever arms that are bowed axially in a first direction and a second group of spring fingers having cantilever arms that are bowed axially in a second direction opposite said first direction.

2. A ball joint as set forth in claim 1 wherein said engagement portion of said seal blocks engagement between said spring fingers of said spring and said shank portion of said stud.

3. A ball joint as set forth in claim 1 wherein said spring fingers have radially inner terminal end surfaces that extend parallel to said shank portion of said stud.

4. A ball joint as set forth in claim 3 wherein each one of said spring fingers includes a cantilever arm that supports said terminal end surface of said spring finger for resilient movement toward and away from said shank portion of said ball stud.

5. A ball joint as set forth in claim 1 wherein said spring fingers of said first group are arranged alternately with said spring fingers of said second group in said circular array.

6. A ball joint as set forth in claim 1 wherein said second end portion of said seal is rotatable on said shank portion of said stud.

7. A ball joint as set forth in claim 1 wherein each one of said spring fingers has an outer cantilever arm extending radially inward from said main body portion, an outer rib portion supported on said outer cantilever arm, an inner cantilever arm extending radially inward from said outer rib portion, and an inner rib portion supported on said inner cantilever arm.

8. A ball joint as set forth in claim 1 wherein said spring fingers of said first group being mirror images of said spring fingers of said second group when viewed in axially opposite directions.

9. A ball joint as set forth in claim 1 wherein each one of said spring fingers has a cylindrical, radially innermost surface supported on said main body portion of said spring for movement toward and away from said main body portion of said spring in response to force applied to said spring.

10. A ball joint comprising:

a socket defining a pivot center;

a bearing in said socket; and a stud having a ball end portion received in said bearing and a shank portion projecting from said socket, said stud having a longitudinal axis extending through said pivot center;

said bearing supporting said stud in said socket for pivotal movement about said pivot center;

said ball joint further comprising an annular seal having an intermediate portion extending between first and second end portions of said seal, said first end portion of said seal being fixed to said socket, said second end portion of said seal having an engagement portion in sealing engagement with said shank portion of said stud;

said seal including a spring molded in said second end portion of said seal and extending for 360 degrees around the circumference of said shank portion of said stud at a location radially outward of said engagement portion of said seal;

said spring having a main body portion and having a circular array of spring fingers that extend radially inward from said main body portion and exert a radially inward directed force on said engagement portion of said seal to maintain said engagement portion of said seal in sealing engagement with said shank portion of said stud, each one of said spring fingers has an outer cantilever arm extending radially inward from said main body portion, an outer rib portion supported on said outer cantilever arm, an inner cantilever arm extending radially inward from said outer rib portion, and an inner rib portion supported on said inner cantilever arm.

11. A ball joint as set forth in claim 10 wherein said engagement portion of said seal blocks engagement between said spring fingers of said spring and said shank portion of said stud.

12. A ball joint as set forth in claim 10 wherein said inner rib portions on said inner cantilever arms have radially inner terminal end surfaces that extend parallel to said shank portion of said stud.

13. A ball joint as set forth in claim 10 wherein said array of spring fingers includes a first group of said spring fingers arranged alternately with a second group of said spring fingers, said spring fingers of said first group being mirror images of said spring fingers of said second group when viewed in axially opposite directions.

14. A ball joint as set forth in claim 11 wherein each one of said spring fingers has a cylindrical, radially innermost surface supported on said main body portion of said spring for movement toward and away from said main body portion of said spring in response to force applied to said spring.

15. A ball joint comprising:

a socket;

a bearing in said socket;

a stud having a ball end portion received in said bearing and a shank portion projecting from said socket, said stud being pivotal relative to said socket; and an annular seal having an intermediate portion extending between first and second end portions of said seal, said first end portion of said seal being connected with said socket, said second end portion of said seal extends around said shank portion of said stud;

said seal including a spring molded in said second end portion of said seal and extending around said shank portion of said stud;

said spring having a main body portion and having a circular array of spring fingers that extend radially inward from said main body portion and exert a radially inward directed force on said seal and maintain sealing engagement with said shank portion of said stud, said spring fingers have radially inner terminal end surfaces, each of said terminal end surfaces being formed as a portion of a cylinder having a central axis which is coincident with a central axis of said stud.

16. A ball joint as set forth in claim 15 wherein each one of said spring fingers includes a cantilever arm that supports said terminal end surface of said spring finger for resilient movement relative to said shank portion of said ball stud.

17. A ball joint as set forth in claim 15 wherein said array of spring fingers includes a first group of spring fingers that are bowed in a first direction and a second group of spring fingers that are bowed in a second direction opposite said first direction.

18. A ball joint as set forth in claim 17 wherein said spring fingers of said first group are arranged alternately with said spring fingers of said second group in said circular array.

19. A ball joint as set forth in claim 15 wherein said second end portion of said seal is movable relative to said shank portion of said stud.

20. A ball joint as set forth in claim 15 wherein said second end portion of said seal is at least partially disposed between said terminal end surfaces on said spring fingers and said shank portion of said stud.

21. A ball joint as set forth in claim 15 wherein at least a portion of each of said spring fingers is exposed at said second end portion of said seal.

22. A ball joint comprising:

a socket;

a bearing in said socket;

a stud having a ball end portion received in said bearing and a shank portion projecting from said socket, said stud being pivotal relative to said socket; and an annular seal having an intermediate portion extending between first and second end portions of said seal, said first end portion of said seal being connected with said socket, said second end portion of said seal extends around said shank portion of said stud;

said seal including a spring molded in said second end portion of said seal and extending around said shank portion of said stud;

said spring having a main body portion and having a circular array of spring fingers that extend radially inward from said main body portion and exert a radially inward directed force on said seal and maintain sealing engagement with said shank portion of said stud, said spring fingers have radially inner terminal end surfaces, each of said terminal end surfaces being formed as a portion of a cylinder having a central axis which is coincident with a central axis of said stud;

each one of said spring fingers has an outer cantilever arm extending radially inward from said main body portion, an outer rib portion supported on said outer cantilever arm, an inner cantilever arm extending radially inward from said outer rib portion, and an inner rib portion supported on said inner cantilever arm, each of said terminal end surfaces being disposed on one of said inner rib portions.

23. A ball joint as set forth in claim 22 wherein one of said cantilever arms supports said terminal end surface of said spring finger for resilient movement relative to said shank portion of said ball stud.

24. A ball joint as set forth in claim 23 wherein said array of spring fingers includes a first group of spring fingers that are bowed in a first direction and a second group of spring fingers that are bowed in a second direction opposite said first direction.

25. A ball joint as set forth in claim 24 wherein said spring fingers of said first group are arranged alternately with said spring fingers of said second group in said circular array.

26. A ball joint as set forth in claim 23 wherein said second end portion of said seal is movable relative to said shank portion of said stud.

27. A ball joint as set forth in claim 23 wherein said second end portion of said seal is at least partially disposed between said terminal end surfaces on said spring fingers and said shank portion of said stud.

28. A ball joint as set forth in claim 23 wherein at least a portion of each of said spring fingers is exposed at said second end portion of said seal.

* * * * *